United States Patent
Koide et al.

(10) Patent No.: US 11,753,495 B2
(45) Date of Patent: Sep. 12, 2023

(54) METHOD FOR PRODUCING POLYURETHANE FOAM

(71) Applicant: INOAC CORPORATION, Aichi (JP)

(72) Inventors: Masahito Koide, Aichi (JP); Yosuke Okada, Aichi (JP); Tadashi Yano, Aichi (JP)

(73) Assignee: INOAC CORPORATION, Aichi (JP)

( * ) Notice: Subject to any disclaimer, the term of this patent is extended or adjusted under 35 U.S.C. 154(b) by 0 days.

(21) Appl. No.: 16/771,915

(22) PCT Filed: Dec. 14, 2018

(86) PCT No.: PCT/JP2018/046134
§ 371 (c)(1),
(2) Date: Jun. 11, 2020

(87) PCT Pub. No.: WO2019/117292
PCT Pub. Date: Jun. 20, 2019

(65) Prior Publication Data
US 2020/0399417 A1 Dec. 24, 2020

(30) Foreign Application Priority Data
Dec. 15, 2017 (JP) .................. 2017-240428
Dec. 12, 2018 (JP) .................. 2018-232808

(51) Int. Cl.
| | |
|---|---|
| C08G 18/08 | (2006.01) |
| C08G 18/16 | (2006.01) |
| C08G 18/20 | (2006.01) |
| C08G 18/24 | (2006.01) |
| C08G 18/48 | (2006.01) |
| C08G 18/62 | (2006.01) |
| C08G 18/76 | (2006.01) |
| C08J 9/08 | (2006.01) |
| C08J 9/14 | (2006.01) |
| C08K 3/26 | (2006.01) |
| C08K 5/09 | (2006.01) |
| C08K 5/092 | (2006.01) |

(52) U.S. Cl.
CPC ......... *C08G 18/14* (2013.01); *C08G 18/4833* (2013.01); *C08G 18/6225* (2013.01); *C08G 18/7621* (2013.01); *C08K 3/26* (2013.01); *C08K 5/092* (2013.01); *C08G 2110/0083* (2021.01); *C08K 2003/262* (2013.01)

(58) Field of Classification Search
None
See application file for complete search history.

(56) References Cited

U.S. PATENT DOCUMENTS

| | | | |
|---|---|---|---|
| 4,189,541 A * | 2/1980 | Ohashi | C08J 9/0061 521/110 |
| 6,037,384 A | 3/2000 | Kakizawa et al. | |
| 6,110,578 A | 8/2000 | Kakizawa et al. | |
| 6,162,839 A | 12/2000 | Klauck et al. | |
| 2001/0006986 A1* | 7/2001 | Sieker | C08G 18/4018 521/129 |
| 2006/0025489 A1 | 2/2006 | Yano | |
| 2007/0100009 A1 | 5/2007 | Creazzo et al. | |
| 2007/0100010 A1 | 5/2007 | Creazzo et al. | |
| 2007/0100011 A1 | 5/2007 | Creazzo et al. | |
| 2007/0102021 A1 | 5/2007 | Nappa et al. | |
| 2007/0105738 A1 | 5/2007 | Nappa et al. | |
| 2010/0071550 A1 | 3/2010 | Hauville | |
| 2010/0152093 A1 | 6/2010 | Nappa et al. | |
| 2010/0189885 A1 | 7/2010 | Nappa et al. | |
| 2011/0041878 A1 | 2/2011 | Nappa et al. | |
| 2011/0237488 A1 | 9/2011 | Nappa et al. | |
| 2011/0259191 A1 | 10/2011 | Hauville | |
| 2011/0311802 A1 | 12/2011 | Cho et al. | |
| 2013/0272935 A1 | 10/2013 | Hauville | |
| 2014/0037522 A1 | 2/2014 | Hauville et al. | |
| 2014/0058003 A1 | 2/2014 | Owens et al. | |
| 2014/0344867 A1 | 2/2014 | Creazzo et al. | |
| 2014/0117270 A1 | 5/2014 | Yin et al. | |
| 2014/0128488 A1 | 5/2014 | Lotti et al. | |
| 2014/0369991 A1 | 12/2014 | Schutte et al. | |
| 2015/0080485 A1 | 3/2015 | Creazzo et al. | |
| 2017/0304483 A1 | 10/2017 | Schutte et al. | |
| 2019/0177463 A1* | 6/2019 | Lutter | C08G 18/4808 |

FOREIGN PATENT DOCUMENTS

| | | | | |
|---|---|---|---|---|
| CA | 2456119 C | * | 9/2010 | ......... C08G 18/1875 |
| JP | 63-301239 A | | 12/1988 | |
| JP | 4-202337 A | | 7/1992 | |
| JP | 9-263651 A | | 10/1997 | |
| JP | 2000-502032 A | | 2/2000 | |

(Continued)

OTHER PUBLICATIONS

International Search Report (PCT/ISA/210) dated Feb. 19, 2019 issued by the International Searching Authority in International Application No. PCT/JP2018/046134.

(Continued)

*Primary Examiner* — Melissa A Rioja

(74) *Attorney, Agent, or Firm* — Sughrue Mion, PLLC

(57) ABSTRACT

A method for producing a polyurethane foam includes mixing and reacting a polyurethane foam raw material containing a polyol, an isocyanate, a foaming agent, and a catalyst, wherein the polyurethane foam raw material contains sodium bicarbonate and an organic solid acid such as citric acid or malic acid.

7 Claims, 3 Drawing Sheets

(56) References Cited

FOREIGN PATENT DOCUMENTS

| | | |
|---|---|---|
| JP | 2001-205287 A | 7/2001 |
| JP | 2006-199869 A | 8/2006 |
| JP | 2006-199897 A | 8/2006 |
| JP | 2009-513812 A | 4/2009 |
| JP | 4410665 B2 | 2/2010 |
| JP | 2012-172075 A | 9/2012 |
| JP | 2014-515409 A | 6/2014 |
| JP | 2014-518250 A | 7/2014 |
| JP | 2014-518299 A | 7/2014 |
| JP | 2014-522885 A | 9/2014 |
| JP | 2015-516184 A | 6/2015 |
| JP | 2016-160306 A | 9/2016 |

OTHER PUBLICATIONS

Written Opinion (PCT/ISA/237) dated Feb. 19, 2019 issued by the International Searching Authority in International Application No. PCT/JP2018/046134.
"Plastics Forming Processes", edited by Chengdu University of Technology, Light Industry Press, 1983, p. 253 (3 pages total).
Klemna, Lewis Hills Ed., "Plastic Materials", Guangdong Higher Education Press, 2017, pp. 282 & 285 (4 pages total).
Yong et al., Ed., "Handbook of Rubber Industries, 6 Division of Industrial Rubber Products", Chemical Industry Press, 1993, p. 488 (3 pages total).

* cited by examiner

Fig. 1

< WHEN ORGANIC SOLID ACID IS CITRIC ACID >

★ ENDOTHERMIC REACTION IN FIRST STAGE

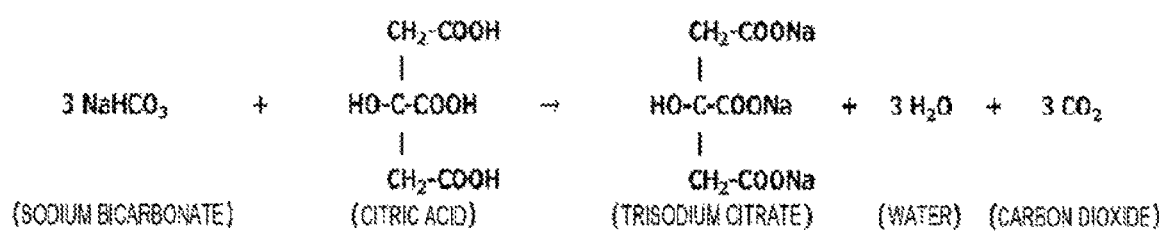

(SODIUM BICARBONATE)　(CITRIC ACID)　(TRISODIUM CITRATE)　(WATER)　(CARBON DIOXIDE)

★ ENDOTHERMIC REACTION IN SECOND STAGE

Fig. 2

< WHEN ORGANIC SOLID ACID IS MALIC ACID >

★ ENDOTHERMIC REACTION IN FIRST STAGE

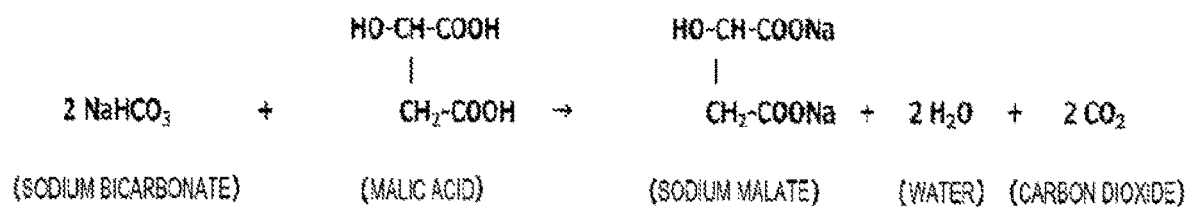

(SODIUM BICARBONATE)　(MALIC ACID)　(SODIUM MALATE)　(WATER)　(CARBON DIOXIDE)

★ ENDOTHERMIC REACTION IN SECOND STAGE

Fig. 3

| | Comparative Example 1 | Comparative Example 2 | Comparative Example 3 | Comparative Example 4 | Comparative Example 5 | Comparative Example 6 |
|---|---|---|---|---|---|---|
| Polyol 1 | 100 | 100 | 100 | 50 | 100 | 100 |
| Polyol 2 | | | | 50 | | |
| Foaming agent (water) | 6 | 6 | 4.9 | 4.9 | 6 | 6 |
| Foaming auxiliary (methylene chloride) | | | 6 | 6 | | |
| Amine catalyst | 0.4 | 0.4 | 0.4 | 0.4 | 0.4 | 0.4 |
| Metal catalyst | 0.4 | 0.3 | 0.35 | 0.35 | 0.4 | 0.4 |
| Foam stabilizer (surfactant) | 1 | 1 | 1 | 1 | 1 | 1 |
| Sodium bicarbonate | | | | | 6 | |
| Citric acid | | | | | | |
| Malic acid | | | | | | 1 |
| Gypsum dihydrate | | 20 | | | | |
| Colorant | 13 | 13 | 13 | 0 | 13 | 13 |
| Isocyanate T-80 | 75.1 | 75.1 | 63.3 | 60.4 | 75.1 | 75.1 |
| INDEX | 110 | 110 | 110 | 110 | 110 | 110 |
| <Reactivity and appearance> | | | | | | |
| Cream time (s) | 14 | 16 | 14 | 15 | 12 | 32 |
| Rise time (s) | 68 | 72 | 76 | 82 | 60 | 125 |
| Foam state | ○ | ○ | ○ | ○ | ○ | × |
| Maximum heat generation temperature (°C) | 182 | 154 | 158 | 156 | 172 | |
| Heat generation level | High | Low | Low | Low | High | |
| Stripe state | ○ | × | ○ | ○ | × | |
| <Physical properties> | | | | | | |
| Density (kg/m³) | 17.2 | 22.4 | 20.0 | 21.3 | 19.3 | |
| Hardness (N) | 85 | 100 | 92 | 130 | 90 | |
| Tensile strength (MPa) | 77 | 98 | 100 | 98 | 98 | |
| Elongation (%) | 67 | 138 | 150 | 95 | 73 | |
| Compression residual strain (%) | 17.9 | 5 | 3.8 | 6.2 | 12.7 | |

Fig. 4

| | Example 1 | Example 2 | Example 3 | Example 4 | Example 5 | Example 6 | Example 7 |
|---|---|---|---|---|---|---|---|
| Polyol 1 | 100 | 100 | 100 | 50 | 100 | 100 | 100 |
| Polyol 2 | | | | 50 | | | |
| Foaming agent (water) | 6 | 6 | 6 | 6 | 6 | 5.4 | 5.4 |
| Foaming auxiliary (methylene chloride) | | | | | | | |
| Amine catalyst | 0.4 | 0.4 | 0.4 | 0.4 | 0.4 | 0.4 | 0.4 |
| Metal catalyst | 0.4 | 0.4 | 0.4 | 0.4 | 0.4 | 0.4 | 0.4 |
| Foam stabilizer (surfactant) | 1 | 1 | 1 | 1 | 1 | 1 | 1 |
| Sodium bicarbonate | 3 | 6 | 10 | 6 | 6 | 0.5 | 1 |
| Citric acid | 0.2 | 0.2 | 0.5 | 0.2 | | | |
| Malic acid | | | | | 0.2 | 0.2 | 0.2 |
| Gypsum dihydrate | | | | | | | |
| Colorant | 13 | 13 | 13 | 0 | 13 | 0 | 0 |
| Isocyanate T-80 | 75.1 | 75.1 | 75.1 | 72.1 | 75.1 | 64.7 | 64.7 |
| INDEX | 110 | 110 | 110 | 110 | 110 | 105 | 105 |
| <Reactivity and appearance> | | | | | | | |
| Cream time (s) | 18 | 15 | 17 | 16 | 17 | 13 | 13 |
| Rise time (s) | 107 | 95 | 102 | 93 | 98 | 70 | 64 |
| Foam state | ○ | ○ | ○ | ○ | ○ | ○ | ○ |
| Maximum heat generation temperature (°C) | 162 | 157 | 145 | 154 | 160 | 156 | 155 |
| Heat generation level | Medium | Low | Low | Low | Medium | Low | Low |
| Stripe state | ○ | ○ | ○ | ○ | ○ | ○ | ○ |
| <Physical properties> | | | | | | | |
| Density (kg/m³) | 20.5 | 21.0 | 21.3 | 21.5 | 20.9 | 21.6 | 21.1 |
| Hardness (N) | 110 | 112 | 109 | 128 | 111 | 105 | 98 |
| Tensile strength (MPa) | 107 | 109 | 102 | 108 | 110 | 101 | 95 |
| Elongation (%) | 138 | 148 | 142 | 98 | 152 | 134 | 126 |
| Compression residual strain (%) | 4.8 | 5.2 | 5.5 | 6.1 | 4.8 | 5.4 | 6.9 |

METHOD FOR PRODUCING POLYURETHANE FOAM

TECHNICAL FIELD

The present invention relates to a method for producing a polyurethane foam.

BACKGROUND ART

The polyurethane foam is widely used for cushion materials such as clothing pads, furniture, bedding, and automobile seats. The polyurethane foam is produced by mixing and reacting a polyurethane foam raw material containing a polyol, an isocyanate, a foaming agent, and a catalyst.

One of the features of the polyurethane foam is lightweight property. In order to enhance the lightweight property of the polyurethane foam, it is necessary to increase the amount of the foaming agent to obtain a low-density polyurethane foam. However, in order to produce the low-density polyurethane foam, when only water is used as the foaming agent and an addition amount thereof is increased, the heat generation temperature due to the reaction (foaming reaction and resinification reaction) reaches a high temperature of 170° C. or higher. Then, due to the heat generation, scorch (burn) occurs in the polyurethane foam, which may cause deterioration in quality. In order to prevent the occurrence of the scorch due to the heat generation, a method of adding methylene chloride or liquefied carbon dioxide as a foaming auxiliary instead of increasing the addition amount of water is known.

However, since methylene chloride has an adverse influence on the environment and the like, the use thereof is regulated. On the other hand, use of the liquefied carbon dioxide requires special equipment for supplying the liquefied carbon dioxide at a high pressure in use, and there are problems that the production apparatus is complicated and the production cost increases.

As a method of lowering the heat generation temperature, there is known a method in which a bicarbonate is added to a polyurethane foam raw material, the bicarbonate is decomposed by the heat generated during the production of the polyurethane foam to generate water, and the latent heat of vaporization (heat of vaporization) of the water prevents the heat generation (Patent Literature 1). Since the decomposition reaction of the bicarbonate is an endothermic reaction, the heat generation during the production of the polyurethane foam can also be prevented thereby.

As another method of lowering the heat generation temperature, there is known a method in which a hydrate of an inorganic compound having a decomposition temperature of 100° C. to 170° C. is added to the polyurethane foam raw material, and an increase in the heat generation temperature is prevented by evaporation of water generated by the decomposition of the hydrate of the inorganic compound (Patent Literature 2).

CITATION LIST

Patent Literature

Patent Literature 1: JP-A-2006-199869
Patent Literature 2: Japanese Patent No. 4410665

SUMMARY OF INVENTION

Problems that the Invention is to Solve

However, in the method of adding the bicarbonate to the polyurethane foam raw material, the decomposition temperature of the bicarbonate is, for example, 270° C. in the case of sodium bicarbonate, and the decomposition of the bicarbonate does not start until the heat generation temperature during the production of the polyurethane foam is equal to or higher than the decomposition temperature of the bicarbonate, so that the scorch may progress during this time period.

On the other hand, in the method of adding the hydrate of the inorganic compound to the polyurethane foam raw material, when the amount of water as the foaming agent added to the polyurethane foam raw material is large, the reaction between water and the isocyanate is rapidly carried out, so that it is difficult to adjust the reaction. Therefore, in this method, appearance defects such as flow stripes on the surface of the polyurethane foam when continuously discharging the polyurethane foam raw material from an injection machine for a polyurethane foam raw material and cracks on the cured surface, may occur. In addition, when the addition amount of the hydrate of the inorganic compound increases, the density of the polyurethane foam is larger. Therefore, in order to lower the density of the polyurethane foam, it is necessary to increase the amount of water as the foaming agent, whereby the reaction between the water and the isocyanate is rapidly carried out or the heat generation increases.

The present invention has been made in view of the above points, and an object thereof is to provide a production method capable of preventing a rise in heat generation temperature due to the mixing and reaction of the polyurethane foam raw material, preventing the occurrence of scorch, and obtaining a low-density polyurethane foam.

Means for Solving the Problems

A method for producing a polyurethane foam according to the present invention, which can solve the above problems, is (1) a method for producing a polyurethane foam, comprising: mixing and reacting a polyurethane foam raw material containing a polyol, an isocyanate, a foaming agent, and a catalyst, wherein
the polyurethane foam raw material contains sodium bicarbonate and an organic solid acid.

(2) In the above (1), the organic solid acid preferably has a melting point of 40° C. to 190° C.

(3) In the above (1) or (2), the organic solid acid is preferably citric acid.

(4) In the above (3), an addition amount of the sodium bicarbonate is preferably 3 to 50 times an addition amount of the citric acid in a weight ratio.

(5) In the above (3) or (4), the addition amount of the sodium bicarbonate is preferably 0.4 to 15 pats by weight and the addition amount of the citric acid is preferably 0.1 to 0.8 part by weight, based on 100 parts by weight of the polyol.

(6) In the above (1) or (2), the organic solid acid is preferably malic acid.

(7) In the above (6), an addition amount of the sodium bicarbonate is preferably 2 to 50 times an addition amount of the malic acid in a weight ratio.

(8) In the above (6) or (7), the addition amount of the sodium bicarbonate is preferably 0.4 to 15 parts by weight and the addition amount of the malic acid is preferably 0.1 to 1.0 part by weight, based on 100 parts by weight of the polyol.

Advantageous Effects of Invention

According to the production method of the present invention, after mixing the polyurethane foam raw material, the endothermic reaction in a first stage between the sodium bicarbonate and the organic solid acid added to the polyurethane foam raw material is slowly started, and a temperature rise due to the reaction of the polyurethane foam raw material can be prevented. If the melting point of the organic solid acid is 40° C. to 190° C., after the start of the reaction (foaming reaction or resinification reaction) during the production of the polyurethane, the endothermic reaction in the first stage with sodium bicarbonate can proceed more reliably, the heat generation temperature can be lowered, and a decrease in physical properties can be also prevented. Further, in the case of an organic solid acid having the melting point range above, the polyurethane foam raw material such as a polyol, a catalyst, a foam stabilizer (surfactant), and a foaming agent can be blended beforehand, and the polyurethane foam can be produced without using special production equipment.

The endothermic reaction in the first stage when the organic solid acid is citric acid is as shown in FIG. 1. The reaction between sodium bicarbonate and citric acid produces trisodium citrate, water and carbon dioxide, and the heat absorption at this time can prevent the temperature rise due to the reaction of the polyurethane foam raw material.

In addition, the sodium bicarbonate not consumed in the endothermic reaction in the first stage causes the endothermic reaction in a second stage shown in FIG. 1 by heat generation in the subsequent reaction of the polyurethane foam raw material, and the temperature rise due to the reaction of the polyurethane foam raw material can be further prevented. In the endothermic reaction in the second stage, the sodium bicarbonate not consumed in the endothermic reaction in the first stage is thermally decomposed into sodium carbonate, water and carbon dioxide.

In the endothermic reaction in the first stage when the organic solid acid is citric acid, since 3 moles of sodium bicarbonate reacts with 1 mole of citric acid, the addition amount of the sodium bicarbonate must be 3 times or more the addition amount of the citric acid in a molar ratio in order to carry out the endothermic reaction in the second stage. In addition, since the molecular weight of sodium bicarbonate is 84 and the molecular weight of citric acid is 192, the addition amount of the sodium bicarbonate for carrying out the endothermic reaction in the second stage after the endothermic reaction in the first stage must be 1.32 times or more the addition amount of the citric acid in a weight ratio. The preferred addition amount of the sodium bicarbonate is 3 to 50 times and more preferably 5 to 40 times the addition amount of the citric acid in a weight ratio, and within this range, the endothermic reaction in the second stage can be sufficiently carried out.

Further, the endothermic reaction in the first stage and the endothermic reaction in the second stage when the organic solid acid is malic acid are shown in FIG. 2. In the endothermic reaction in the first stage, since 2 moles of sodium bicarbonate reacts with 1 mole of malic acid, the addition amount of the sodium bicarbonate must be twice or more the addition amount of the malic acid in a molar ratio in order to carry out the endothermic reaction in the second stage. In addition, since the molecular weight of sodium bicarbonate is 84 and the molecular weight of malic acid is 134, the addition amount of the sodium bicarbonate for carrying out the endothermic reaction in the second stage after the endothermic reaction in the first stage must be 1.26 times or more the addition amount of the malic acid in a weight ratio. The preferred addition amount of the sodium bicarbonate is 2 to 50 times and more preferably 2.5 to 40 times the addition amount of the malic acid in a weight ratio, and within this range, the endothermic reaction in the second stage can be sufficiently carried out.

In addition, water and carbon dioxide are generated as reaction decomposition products of the sodium bicarbonate and the organic solid acid (for example, citric acid or malic acid), and the generated water evaporates, and carbon dioxide is naturally released from the polyurethane foam, so that the polyurethane foam can be lightened.

Further, since the organic solid acid is added as a raw material, a rapid reaction of the polyurethane foam raw material is prevented by the liquefied organic acid, whereby the occurrence of appearance defects such as flow stripes when discharging from the polyurethane foam injection machine and cracks after curing can be prevented.

Furthermore, compared with the addition of sodium bicarbonate alone or a hydrate of an inorganic compound, the addition of sodium bicarbonate and an organic solid acid provides a large endothermic effect by a small addition amount. Therefore, even with the same addition amount of the foaming agent as that in the addition of sodium bicarbonate alone or a hydrate of an inorganic compound, the low density (light-weighting) of the polyurethane foam becomes possible.

BRIEF DESCRIPTION OF DRAWINGS

FIG. 1 is a diagram showing an endothermic reaction between sodium bicarbonate and citric acid.

FIG. 2 is a diagram showing an endothermic reaction between sodium bicarbonate and malic acid.

FIG. 3 is a table showing compositions and measurement results of physical properties of Comparative Examples.

FIG. 4 is a table showing compositions and measurement results of physical properties of Examples.

MODES FOR CARRYING OUT THE INVENTION

The production of the polyurethane foam of the present invention is carried out by mixing and reacting a polyurethane foam raw material containing a polyol, an isocyanate, a foaming agent, a catalyst, sodium bicarbonate, and an organic solid acid.

As the polyol, a polyol for polyurethane foam can be used. For example, any of a polyether polyol, a polyester polyol, and a polyetherester polyol may be used, and one or more kinds thereof may be used.

Examples of the polyether polyol include polyether polyols obtained by adding an alkylene oxide such as ethylene oxide (EO) or propylene oxide (PO) to a polyhydric alcohol such as ethylene glycol, diethylene glycol, propylene glycol, dipropylene glycol, butylene glycol, neopentyl glycol, glycerin, pentaerythritol, trimethylolpropane, sorbitol, and sucrose.

Examples of the polyester polyol include polyester polyols obtained by polycondensation of aliphatic carboxylic acids such as malonic acid, succinic acid and adipic acid, or aromatic carboxylic acids such as phthalic acid, with aliphatic glycols such as ethylene glycol, diethylene glycol and propylene glycol.

Examples of the polyetherester polyol include those obtained by reacting the above polyether polyol with a polybasic acid to form a polyester, or those having both segments of a polyether and a polyester in one molecule.

As the polyol, it is preferable to use one or more polyols each having a hydroxyl value (OHV) of 20 mgKOH/g to 300 mgKOH/g, a functional group number of 2 to 6, and a number average molecular weight of 500 to 15,000.

As the isocyanate, aliphatic or aromatic polyisocyanates having two or more isocyanate groups, a mixture thereof, and modified polyisocyanates obtained by modifying the above polyisocyanates can be used. Examples of the aliphatic polyisocyanate include hexamethylene diisocyanate, isophorone diisocyanate, and dicyclohexamethane diisocyanate. Examples of the aromatic polyisocyanate include toluene diisocyanate (TDI), diphenylmethane diisocyanate (MDI), naphthalene diisocyanate, xylylene diisocyanate, and polymeric MD (crude MDI). Other prepolymers can also be used.

The isocyanate index (INDEX) is preferably 80 or more, and more preferably 90 to 130. The isocyanate index is a value obtained by dividing the number of moles of isocyanate groups in the isocyanate by the total number of moles of active hydrogen groups such as hydroxy groups of the polyol and then multiplying the obtained value by 100, and is calculated as [NCO equivalent of isocyanate/active hydrogen equivalent×100].

The foaming agent is preferably water. Water generates carbon dioxide during the reaction between the polyol and the isocyanate, and foaming occurs due to carbon dioxide. The amount of water as the foaming agent is preferably 4 to 10 parts by weight based on 100 pans by weight of the polyol.

As the catalyst, a known urethanization catalyst can be used in combination. Examples thereof include: amine catalysts such as triethylamine, triethylenediamine, diethanolamine, dimethylaminomorpholine, N-ethylmorpholine, and tetramethylguanidine; and metal catalysts (also called organometallic catalysts) such as tin catalysts such as stannous octoate and dibutyltin dilaurate, phenylmercury propionate or lead octenoate. The catalyst may be either an amine catalyst or a metal catalyst alone, or a combination of both. The amount of the amine catalyst is preferably 0.05 to 1.0 part by weight based on 100 parts by weight of the polyol. The amount of the metal catalyst is preferably 0 or 0.05 to 0.5 parts by weight.

Sodium bicarbonate is added to the polyurethane foam raw material. The addition amount of the sodium bicarbonate is preferably in the range of 0.4 to 15 parts by weight based on 100 parts by weight of the polyol. When the addition amount is within the above range, the endothermic reaction can be carried out more favorably.

The organic solid acid is an organic acid that is solid at normal temperature (23° C.). The organic solid acid is preferably an organic acid having a melting point of 40° C. to 190° C., particularly a hydroxy acid or carboxylic acid, and the melting point is more preferably 100° C. to 170° C. When an organic solid acid having a melting point in the above range is used, after the start of the reaction (foaming reaction or resinification reaction) during the production of the polyurethane, the endothermic reaction in the first stage with sodium bicarbonate can proceed more reliably, the heat generation temperature can be lowered, and a decrease in physical properties can be prevented. Further, in the case of an organic solid acid having the above melting point range, the polyurethane foam raw material such as a polyol, a catalyst, a foam stabilizer (surfactant), and a foaming agent can be blended beforehand, and the polyurethane foam can be produced without using special production equipment.

Examples of the organic solid acid having a melting point of 40° C. to 190° C. include aliphatic hydroxy acids, aromatic hydroxy acids, polybasic carboxylic acids having a hydroxy group, and carboxylic acids. Examples of the aliphatic hydroxy acids include aliphatic hydroxy acids such as glycolic acid (melting point: 75° C.), malic acid (melting point: 130° C.), tartaric acid (melting point: 151° C. to 170° C.), citric acid (melting point: 153° C.), quinic acid (melting point: 168° C.), and shikimic acid (melting point: 185° C. to 187° C.). Examples of the aromatic hydroxy acids include salicylic acid (melting point: 159° C.), orsellinic acid (melting point: 175° C.), mandelic acid (melting point: 119° C.), benzylic acid (melting point: 150° C. to 152° C.), and ferulic acid (melting point: 168° C. to 172° C.)

Examples of the carboxylic acids include saturated fatty acids, unsaturated fatty acids aromatic carboxylic acids, and dicarboxylic acids.

Examples of the saturated fatty acids include 12-lauric acid (melting point: 44° C. to 46° C.), myristic acid (melting point: 544° C.), pentadecanoic acid (melting point: 51° C. to 53° C.), palmitic acid (melting point: 62.9° C.), margaric acid (melting point 61° C.), stearic acid (melting point: 69.9° C.), behenic acid (melting point: 74° C. to 78° C.), and lignoceric acid (melting point: 84.2° C.).

Examples of the unsaturated fatty acids include oleic acid (melting point: 134° C.), sorbic acid (melting point: 135° C.), and elaidic acid (melting point: 43° C. to 45° C.). Examples of the aromatic carboxylic acids include benzoic acid (melting point 122.4° C.) and cinnamic acid (melting point: 133° C.). Examples of the dicarboxylic acids include malonic acid (melting point: 135° C.), glutaric acid (melting point: 95° C. to 98° C.), adipic acid (melting point: 152° C.), maleic acid (melting point: 131° C.), and succinic acid (melting point: 185° to 187° C.).

Particularly, citric acid (melting point: 153° C.) and malic acid (hydroxy acid, melting point: 130° C.) are more preferred organic solid acids in the present invention.

The addition amount of the citric acid is preferably 0.1 to 0.8 part by weight, and more preferably 0.1 to 0.6 part by weight, based on 100 parts by weight of the polyol. When the addition amount is within the above range, the endothermic reaction with sodium bicarbonate can be carried out more favorably.

On the other hand, the addition amount of the malic acid is preferably 0.1 to 1.0 pan by weight, more preferably 0.1 to 0.8 part by weight, and even more preferably 0.1 to 0.6 part by weight, based on 100 parts by weight of the polyol. When the addition amount is within the above range, the endothermic reaction with sodium bicarbonate can be carried out more favorably.

When citric acid is used as the organic solid acid, the addition amount of the sodium bicarbonate is preferably 3 to 50 times and more preferably 5 to 40 times the addition amount of the citric acid in a weight ratio. With the above addition amount in a weight ratio, the endothermic reaction in the second stage can be carried out after the endothermic reaction in the first stage in FIG. 1.

On the other hand, when malic acid is used as the organic solid acid, the addition amount of the sodium bicarbonate is preferably 2 to 50 times and more preferably 2.5 to 40 times the addition amount of the malic acid in a weight ratio. With the above addition amount in a weight ratio, the endothermic reaction in the second stage can be carried out after the endothermic reaction in the first stage in FIG. 2.

Other auxiliaries may be added to the polyurethane foam raw material. Examples of the auxiliary include a foam stabilizer (surfactant) and a colorant. As the foam stabilizer (surfactant), those known for the polyurethane foam can be used. Examples thereof include a silicone-based foam stabilizer (surfactant), a fluorine-based foam stabilizer (surfactant) and a known surfactant. As the colorant, a carbon pigment or the like depending on the use of the polyurethane foam or the like can be used.

Foaming in the production of the polyurethane foam is preferably slab foaming. The slab foaming is a method of mixing the polyurethane foam raw material, discharging the mixture onto a belt conveyor, and foaming the mixture at atmospheric pressure and normal temperature.

EXAMPLES

The following components were mixed according to the compositions shown in FIG. 3 and FIG. 4 and reacted and foamed to produce polyurethane foams of Comparative Examples and Examples. The unit of the addition amount of each component is part by weight.

Polyol 1: polyether polyol, number average molecular weight: 3000, functional group number: 3, hydroxyl value: 56.1 mgKOH/g, product number: GP-3000, manufactured by Sanyo Chemical Industries, Ltd.

Polyol 2: polymer polyol, functional group number: 3, hydroxyl value: 32 mgKOH/g, product number: EL-941, manufactured by Asahi Glass Co., Ltd.

Foaming agent: water

Foaming auxiliary: methylene chloride, product number: Shin-Etsu Methylene Chloride, manufactured by Shin-Etsu Chemical Co., Ltd.

Amine catalyst: product number: 33LV, manufactured by Air Products and Chemicals, Inc.

Metal catalyst: stannous octylate, product number: MRH110, manufactured by Johoku Chemical Co., Ltd.

Foam stabilizer (surfactant): silicone-based foam stabilizer (surfactant), product number: B8110, manufactured by Goldschmidt-Thermit Japan Co., Ltd.

Sodium bicarbonate

Citric acid

Malic acid

Gypsum dihydrate: specific gravity: 2.32, gypsum dihydrate with an average particle size of 40 μm, manufactured by Notitake Co. Ltd.

Colorant: carbon pigment (black pigment with carbon content of 20 wt %), product number PC4114, manufactured by Dainippon Ink and Chemicals, Inc.

Isocyanate: 2,4-TDI/2,6-TDI=80/20, Product number: Coronate T-80, manufactured by Nippon Polyurethane Industry Co., Ltd.

During the production of the polyurethane foam in each of Comparative Examples and Examples, a cream time and a rise time were measured to determine the reactivity. The cream time is a time period from a time when a reaction mixture causes the foaming reaction to a time when the reaction mixture begins to become creamy from a liquid state during mixing and discharge, and means the start time of the foaming reaction. On the other hand, the rise time is a time period from the time of mixing and discharging to the time when a maximum foaming height is reached. The cream time indicates that the initial reaction is rapid when it is short, and that the initial reaction is moderate when it is long. On the other, since the rise time is the time period to reach the maximum foaming height, a small value obtained by subtracting the cream time from the rise time indicates that the reaction after the cream time is rapid, and conversely, a large value after subtraction indicates that the reaction after the cream time is moderate.

The state during the foaming was visually determined, and the foam state was evaluated as "x" when foaming failure such as down occurred, and the foam state was evaluated as "○" when foaming was satisfactory.

Regarding the temperature during the foaming, a thermocouple was set at the center of the polyurethane foam during the foaming, and the maximum heat generation temperature was measured. When the measurement result of the maximum heat generation temperature was 170° C. or higher, the heat generation level was "high", when the measurement result was 160° C. or higher and lower than 170° C., the heat generation level was "medium", and when the measurement result was lower than 160° C., the heat generation level was "low". Regarding the polyurethane foam after the foaming, the appearance was visually observed, and "x" was given when stripes were clearly formed on the surface, and "Δ" was given when the stripes were thin or not present.

Regarding the physical properties of the polyurethane foam after the foaming, the density (JIS K7220), hardness (JIS K6400) tensile strength (JIS K6400), elongation (JIS K6400), and compression residual strain (JIS K6400) were measured.

Comparative Example 1 is an example in which 100 parts by weight of the polyol 1 as a polyol, 6 parts by weight of water as a foaming agent, 0.4 part by weight of an amine catalyst, 0.4 part by weight of a metal catalyst, 1 part by weight of a foam stabilizer (surfactant), 13 parts by weight of a carbon pigment as a colorant, and 75.1 parts by weight of isocyanate T-80 were used, and the isocyanate index was 110, and an example in which none of sodium bicarbonate, citric acid or malic acid as an organic solid acid, or a gypsum dihydrate as a hydrate of an inorganic compound was added. In Comparative Example 1, the cream time was 14 seconds, the rise time was 68 seconds, the foam state was "○", the maximum heat generation temperature was 182° C., the heat generation level was "high", the stripe state was "○", and the density was 17.2 kg/m$^3$. The maximum heat generation temperature was extremely high and there was a scorch problem.

Comparative Example 2 is the same as Comparative Example 1 except that 0.3 part by weight of the metal catalyst and 20 parts by weight of the gypsum dihydrate were used. In Comparative Example 2, the cream time was 16 seconds, the rise time was 72 seconds, the foam state was "○", the maximum heat generation temperature was 154° C., the heat generation level was "low", the stripe state was ">", and the density was 22.4 kg/m$^3$. The maximum heat generation temperature was low. However, as a result of adding 20 parts by weight of the gypsum dihydrate, clear stripes were generated, which caused a problem in appearance, and there was also a problem of a high density (heavy).

Comparative Example 3 is the same as Comparative Example 1 except that 4.9 parts by weight of water as the foaming agent, 6 parts by weight of methylene chloride as the foaming auxiliary, 0.35 part by weight of the metal catalyst and 63.3 parts by weight of the isocyanate T-80 were used. In Comparative Example 3, the cream time was 14 seconds, the rise time was 70 seconds, the foam state was "○", the maximum heat generation temperature was 158° C., the heat generation level was "low", the stripe state was "○", and the density was 20.0 kg/m$^3$. Both the heat generation level and the stripes were good. However, since methylene chloride is used as the foaming auxiliary, there is a problem that the environment is adversely influenced.

Comparative Example 4 is the same as Comparative Example 1 except that 50 parts by weight of the polyol 1 and 50 parts by weight of the polyol 2 were used in combination as the polyol, 4.9 parts by weight of water as the foaming agent, 6 parts by weight of methylene chloride as the foaming auxiliary, 0.35 part by weight of the metal catalyst, 0 part by weight of the colorant, and 60.4 parts by weight of the isocyanate T-80 were used. In Comparative Example 4, the cream time was 15 seconds, the rise time was 82 seconds, the foam state was "○", the maximum heat generation temperature was 156° C., the heat generation level was "low", the stripe state was "○", and the density was 21.3 kg/m. Both the heat generation level and the stripes were good. However, since methylene chloride is used as the foaming auxiliary, there is a problem that the environment is adversely influenced.

Comparative Example 5 is the same as Comparative Example 1 except that 6 parts by weight of sodium bicarbonate was added. In Comparative Example 5, the cream time was 12 seconds, the rise time was 60 seconds, the foam state was "○", the maximum heat generation temperature was 172° C., the heat generation level was "high", the stripe state was "x", and the density was 19.3 kg/n. The maximum heat generation temperature was extremely high, and there was a problem in appearance since the clear stripes were generated.

Comparative Example 6 is the same as Comparative Example 1 except that 1 part by weight of malic acid was added. In Comparative Example 6, the cream time was 32 seconds, the rise time was 125 seconds, and the foam state was "x". The foamed product was down during the foaming, and no foam was obtained.

Example 1 is the same as Comparative Example 1 except that 3 parts by weight of sodium bicarbonate and 0.2 part by weight of citric acid were added. In Example 1, the cream time was 18 seconds, the rise time was 107 seconds, the foam state was "○" the maximum heat generation temperature was 162° C., the heat generation level was "medium", the stripe stare was "○", and the density was 20.5 kg/m. As a result of adding both sodium bicarbonate and citric acid, the reaction was slower, the maximum heat generation temperature was lowered, and the generation of the stripes was prevented, as compared with Comparative Example 1. Further, the density was lower (light weight) as compared with Comparative Example 2 in which the gypsum dihydrate was added.

Example 2 is the same as Example 1 except that the addition amount of the sodium bicarbonate was increased to 6 parts by weight. In Example 2, the cream time was 15 seconds, the rise time was 95 seconds, the foam state was "○", the maximum heat generation temperature was 157° C., the heat generation level was "low", the stripe state was "○", and the density was 21.0 kg/m$^3$. As a result of adding 0.2 part by weight of citric acid and increasing the addition amount of the sodium bicarbonate to 6 parts by weight, Example 2 had a maximum heat generation temperature lower than that of Example 1 and Comparative Example 5.

Example 3 is the same as Example 1 except that the addition amount of the sodium bicarbonate was increased to 10 parts by weight and the citric acid was increased to 0.5 part by weight. In Example 3, the cream time was 17 seconds, the rise time was 102 seconds, the foam state was "○", the maximum heat generation temperature was 145° C., the heat generation level was "low", the stripe state was "○", and the density was 21.3 kg/m$^3$. As a result of increasing the addition amount of the sodium bicarbonate to 10 parts by weight and increasing the citric acid to 0.5 part by weight, the maximum heat generation temperature was lower than that of Example 1 and Example 2.

Example 4 is the same as Example 2 except that 50 parts by weight of the polyol 1 and 50 parts by weight of the polyol 2 were used in combination as the polyol, the addition amount of the colorant was 0 part by weight, and the addition amount of the isocyanate T-80 was 72.1 parts by weight. In Example 4, the cream time was 16 seconds, the rise time was 93 seconds, the foam state was "○", the maximum heat generation temperature was 154° C., the heat generation level was "low", the stripe state was "○", and the density was 21.5 kg/m$^3$. The results were almost the same as those of Example 2 using the polyol 1 alone as the polyol.

Example 5 is the same as Example 2 except that the malic acid was added in an amount of 0.2 part by weight instead of the citric acid. In Example 5, the cream time was 17 seconds, the rise time was 98 seconds, the foam state was "○", the maximum heat generation temperature was 160° C., the heat generation level was "medium", the stripe state was "○", and the density was 20.9 kg/n. As a result of adding the malic acid instead of the citric acid, the maximum heat generation temperature was slightly higher than that of Example 2, but the others were as good as Example 2.

Example 6 is the same as Example 5 except that 5.4 parts by weight of water as the foaming agent, 0.5 part by weight of sodium bicarbonate, 0 part by weight of the colorant, and 64.7 parts by weight of the isocyanate T-80 were used, and the isocyanate index was 105. In Example 6, the cream time was 13 seconds, the rise time was 70 seconds, the foam state was "0", the maximum heat generation temperature was 156° C. the heat generation level was "low", the stripe state was "○", and the density was 21.6 kg/m. The results were almost the same as those of Example 5.

Example 7 is the same as Example 6 except that 1 part by weight of the sodium bicarbonate was used. In Example 7, the cream time was 13 seconds, the rise time was 64 seconds, the foam state was "○", the maximum heat generation temperature was 155° C., the heat generation level was "low", the stripe state was "○", and the density was 21.1 kg/m$^3$. The results were almost the same as those of Example 6.

Thus, the production method of the present invention can prevent a rise in heat generation temperature due to the mixing and reaction of the polyurethane foam raw material, can prevent the occurrence of scorch, and can obtain a low-density polyurethane foam.

Although the present invention has been described in detail and by reference to specific embodiments, it is apparent to those skilled in the art that it is possible to add various alterations and modifications without departing from the spirit and the scope of the present invention.

This application is based on Japanese Patent Application (Japanese Patent Application No. 2017-240428) filed on Dec. 15, 2017 and Japanese Patent Application (Japanese Patent Application No. 2018-232808) filed on Dec. 12, 2018, the contents of which are incorporated herein by reference. In addition, all references referred herein are entirely incorporated.

The invention claimed is:

1. A method for producing a polyurethane foam, comprising:
    mixing and reacting a polyurethane foam raw material containing a polyol, an isocyanate, a foaming agent, and a catalyst,
    wherein the polyurethane foam raw material further contains sodium bicarbonate and an organic solid acid,
    wherein the organic solid acid is citric acid,
    wherein an addition amount of the sodium bicarbonate is 3 to 50 times an addition amount of the citric acid in a weight ratio,
    wherein the reacting includes:
    an endothermic reaction in a first stage in which the sodium bicarbonate and the citric acid react to produce trisodium citrate, water and carbon dioxide; and an endothermic reaction in a second stage in which sodium bicarbonate not consumed in the endothermic reaction in the first stage is decomposed into sodium carbonate, water and carbon dioxide,
wherein the addition amount of the sodium bicarbonate is 0.4 to 15 parts by weight and the addition amount of the citric acid is 0.1 to 0.8 part by weight, based on 100 parts by weight of the polyol, and
wherein the polyol contains a polyether polyol having a hydroxyl value (OHV) of 20 mgKOH/g to 56.1 mgKOH/g.

2. A method for producing a polyurethane foam, comprising: mixing and reacting a polyurethane foam raw material containing a polyol, an isocyanate, a foaming agent, and a catalyst,
wherein the polyurethane foam raw material further contains sodium bicarbonate and an organic solid acid,
wherein the organic solid acid is malic acid,
wherein an addition amount of the sodium bicarbonate is 2 to 50 times an addition amount of the malic acid in a weight ratio,
wherein the reacting includes:
an endothermic reaction in a first stage in which the sodium bicarbonate and the malic acid react to produce sodium malate, water and carbon dioxide; and
an endothermic reaction in a second stage in which sodium bicarbonate not consumed in the endothermic reaction in the first stage is decomposed into sodium carbonate, water and carbon dioxide,
wherein the polyol contains a polyether polyol having a hydroxyl value (OHV) of 20 mgKOH/g to 56.1 mgKOH/g.

3. The method for producing a polyurethane foam according to claim 2,
wherein the addition amount of the sodium bicarbonate is 0.4 to 15 parts by weight and the addition amount of the malic acid is 0.1 to 1.0 part by weight, based on 100 parts by weight of the polyol.

4. The method for producing a polyurethane foam according to claim 1,
wherein the polyurethane foam has an elongation of 98% to 152% measured in accordance with JIS K6400.

5. The method for producing a polyurethane foam according to claim 2,
wherein the polyurethane foam has an elongation of 98% to 152% measured in accordance with JIS K6400.

6. The method for producing a polyurethane foam according to claim 1,
wherein mixing and reacting the polyurethane foam raw material comprises mixing the polyurethane foam raw material, discharging a mixture onto a belt conveyor, and foaming the mixture at atmospheric pressure and normal temperature.

7. The method for producing a polyurethane foam according to claim 2,
wherein mixing and reacting the polyurethane foam raw material comprises mixing the polyurethane foam raw material, discharging a mixture onto a belt conveyor, and foaming the mixture at atmospheric pressure and normal temperature.

* * * * *